United States Patent [19]
Jang et al.

[11] Patent Number: 5,847,944
[45] Date of Patent: Dec. 8, 1998

[54] ROBUST, HARMONIC-INJECTION SYSTEM FOR SINGLE-SWITCH, THREE-PHASE, DISCONTINUOUS-CONDUCTION-MODE BOOST RECTIFIERS

[75] Inventors: Yungtaek Jang; Milan M. Jovanović, both of Blacksburg, Va.

[73] Assignee: Delta Electronics, Inc., Taipei, Taiwan

[21] Appl. No.: 907,096

[22] Filed: Aug. 6, 1997

[51] Int. Cl.[6] .................................................. H02M 1/12
[52] U.S. Cl. ............................................. 363/44; 323/222
[58] Field of Search ........................ 363/53, 44; 323/222, 323/287

[56] References Cited

U.S. PATENT DOCUMENTS 5,406,189   4/1995   Wohlberg et al. ....................... 363/21

OTHER PUBLICATIONS

A.R. Prasad, et al., An Active Power Factor Correction Technique for Three–Phase Diode Rectifiers, pp. 58–65, 1989 IEEE.

Simonetti, et al., Single–Switch Three–Phase Power Factor Preregulator Under Variable Switching Frequency and Discontinuous Input Current, pp.657–662, 1993 IEEE.

Kolar, et al., Space Vector–Based Analytical Analysis of the Input Current Distortion of a Three–Phase Discontinuous––Mode Boost Rectifier System, pp. 696–703, 1993 IEEE.

Qihong Huang, et al., Harmonic Reduction In a Single–Switch, Three–Phase Boost Rectifier with High Order Harmonic Injected PWM[1], Virginia Power Electronics Center, The Bradley Dept. of Elect. Engineering, Virginia Polytechnic Institute and State University, Blacksburg, VA 24061.

International Standard, The American National Standards Institute (ANSI) is the primary source and official sales agent, through their U.S. National Committee, Ref. No. CEI/IEC 555–2: 1982.

Jian Sun, et al., Harmonic Reduction Techniques for Single–Switch Three–Phase Boost Rectifiers, pp. 1225–1232, 1996 IEEE.

*Primary Examiner*—Shawn Riley
*Attorney, Agent, or Firm*—Lane, Aitken & McCann

[57] ABSTRACT

In a single-switch, three-phase DCM boost rectifier, a voltage signal proportional to the inverted ac component of the rectified, three-phase, line-to-line input voltages is injected as a modulating signal into the control circuit to vary the duty cycle of the rectifier within one line cycle. As a result of its generation method, the injected signal is naturally synchronized with the three-phase, line-to-neutral input voltage. In addition, the injection method of this invention does not affect the closed-loop feedback control of the DCM boost rectifier since the injected signal is generated in an open-loop fashion. Three alternative methods to generate the injection signal are described. One method uses three low-frequency, step down transformers in generating the injection signal. The other two methods use operational amplifiers instead of the transformers.

7 Claims, 8 Drawing Sheets

ROBUST, HARMONIC-INJECTION SYSTEM FOR SINGLE-SWITCH, THREE-PHASE, DISCONTINUOUS-CONDUCTION-MODE BOOST RECTIFIERS

BACKGROUND OF THE INVENTION

1. Field of the Invention

This invention relates to an improved single-switch, three-phase, discontinuous-conduction-mode (DCM) boost rectifier and more particularly to a new robust, low-cost, harmonic-injection method to reduce the $5^{th}$-order harmonic of the input current in such rectifiers.

2. Description of the Prior Art

Figure 1:
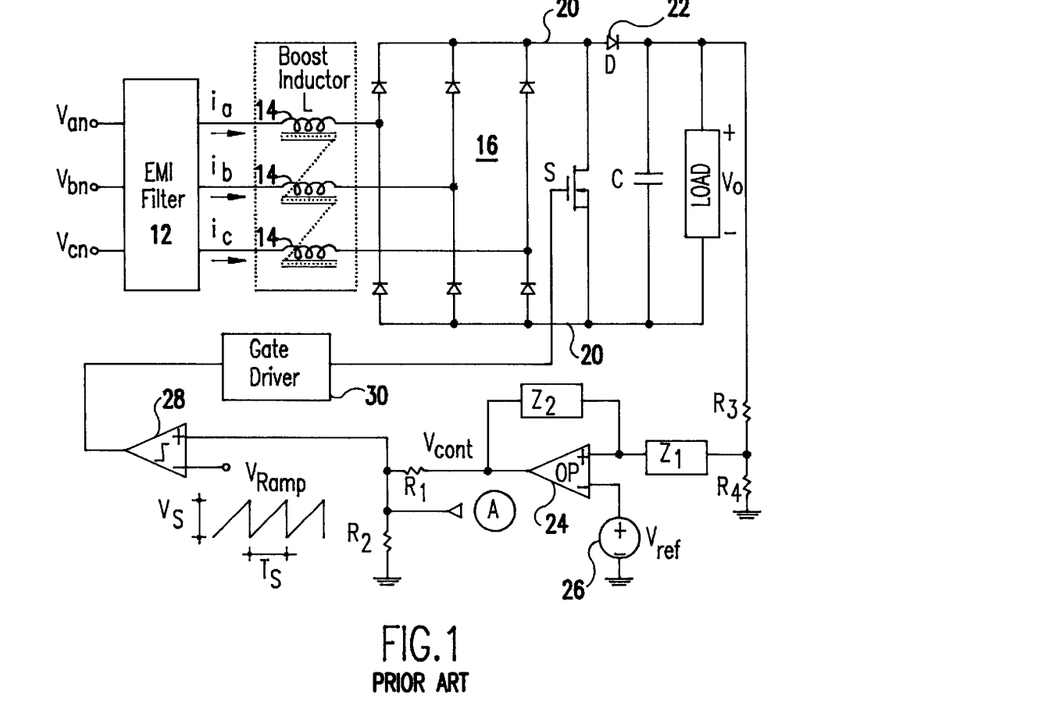
FIG. 1 is a functional diagram of a prior art single-switch, three-phase, DCM boost rectifier with conventional, constant-frequency, low-bandwidth, PWM control.

A prior art DCM, pulse-width-modulated (PWM), high-power-factor (HPF), boost rectifier for three-phase applications is shown in FIG. 1 and is explained and analyzed in an article "An Active Power Factor Correction Technique for Three-Phase Diode Rectifiers," by A. R. Prasad et al., *IEEE Power Electronics Specialists Conf. (PESC) Record*, pp. 58–65, 1989, which is incorporated herein by reference. The major advantages of this prior art rectifier are that its input-current waveshape automatically follows the input-voltage waveshape, and that it can achieve extremely high efficiencies because the reverse-recovery-related losses of the boost diode are eliminated. However, if the rectifier is implemented with the conventional low-bandwidth, output-voltage, PWM feedback control at a constant switching frequency, which keeps the duty cycle of the switch constant during a rectified line period, the rectifier input current exhibits a relatively large $5^{th}$-order harmonic. As a result, at power levels above 5 kW, the $5^{th}$-order harmonic imposes severe design, performance, and cost trade-offs in order to meet the maximum permissible harmonic-current levels defined by the IEC555-2 document.

As will be appreciated by those skilled in the art, in prior art rectifiers such as shown in FIG. 1, each phase voltage (i.e. phase to neutral), $V_{an}$, $V_{bn}$, and $V_{cn}$ is connected via an electromagnetic interference (EMI) filter 12 in series to a respective one of three boost inductors 14. A three phase diode rectifier 16, connected to the boost inductors 14, generates a dc voltage between rails 20. A boost switch S, which periodically opens and closes, is connected between the rails 20. A diode 22 and filter capacitor C couple the rails 20 to a load.

Here, the boost rectifier PWM feedback control, uses a voltage divider $R_3$–$R_4$ to sense the load (output) voltage. An impedance $Z_1$ couples the voltage across $R_4$ as one input to an op amp 24, which includes feedback impedance $Z_2$, and whose other input is coupled to a voltage reference source 26. A resistive network $R_1$, $R_2$, couples the output of the op amp 24 to one input of a comparator 28 whose other input is coupled to a sawtooth signal generator for generating a constant frequency, pulse-width-modulating signal output from the comparator 28. A gate driver 30 couples the output of the comparator 28 to the gate of the switch S. As will be appreciated by those skilled in the art, the output of the comparator 28 is in one state when the ramp voltage exceeds the op amp voltage $V_{cont}$ and is in another state when the ramp voltage is less than $V_{cont}$. In this way the duty cycle of the rectifier is varied to keep the load voltage constant.

Since the boost rectifier in FIG. 1 is operated in DCM with a constant frequency and constant duty cycle, all three-phase input currents, $i_a$, $i_b$, and $i_c$, are zero at the end of a switching period immediately before boost switch S is turned on. After switch S is turned on the rails 20 are shortened, and $i_a$, $i_b$, and $i_c$ increase linearly to the peak values which are proportional to the line-to-neutral voltages. As a result, during switch-on period, the average line currents are proportional to the line-to-neutral voltages. When the switch is turned off, the line currents start decreasing because output voltage $V_o$ is higher than the peak of the input voltage. In DCM, the line currents reach zero before the end of the switching period. Since the rate of the line-current decrease is proportional to the difference between output voltage $V_o$ and line-to-neutral voltage, the average line currents during the switch-off period are not proportional to the line voltages. As a result, even if the line voltages are perfectly balanced and sinusoidal, the line currents are distorted.

Figure 2:
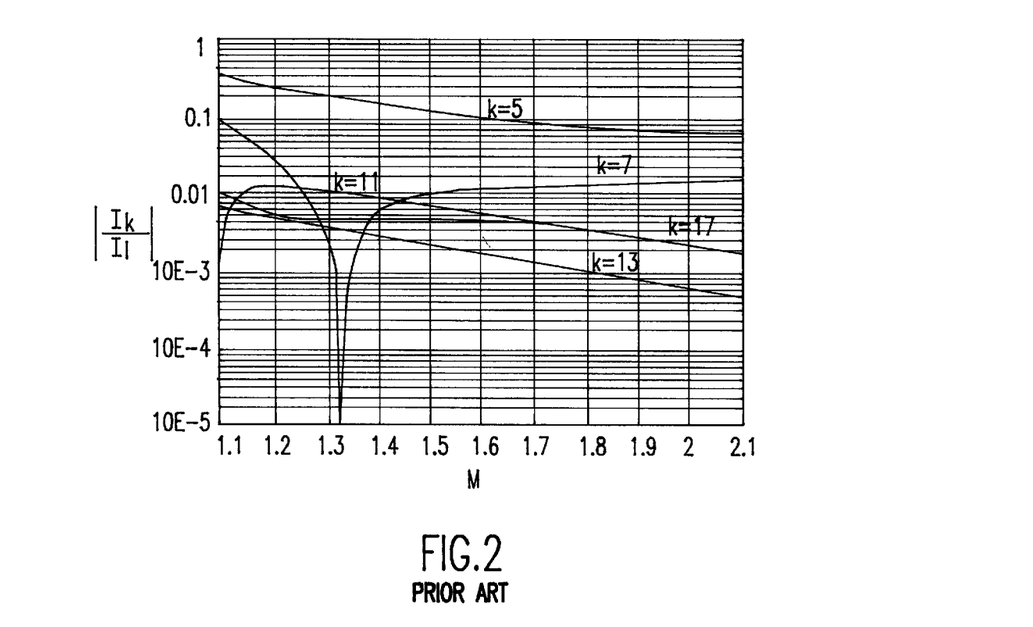
FIG. 2 shows normalized input-current harmonics of the single-switch, three-phase, constant-frequency, constant-duty-cycle, DCM boost rectifier of FIG. 1. Harmonics $I_k$ are normalized with respect to the fundamental component $I_l$.

To further explain the limitations of the circuit in FIG. 1, FIG. 2 shows the normalized harmonic content of the input current of the rectifier in FIG. 1 as a function of the voltage-conversion ratio $M=V_o/V_m$, where $V_m$ is the peak line-to-line voltage. As can be seen from FIG. 2, the rectifier input-current spectrum which contains only odd harmonics is dominated by the $5^{th}$-order harmonic, i.e., the lowest order harmonic. For example, at M=1.2, the $5^{th}$-order harmonic is 8 times larger than the $7^{th}$-order harmonic which is the next largest at M=1.2. Also, it should be noted that the value of the normalized $5^{th}$-order harmonic monotonically decreases as M increases. In fact, it decreases from slightly over 30% of the fundamental component at M=1.1 to approximately 7% at M=2.

Figure 3:
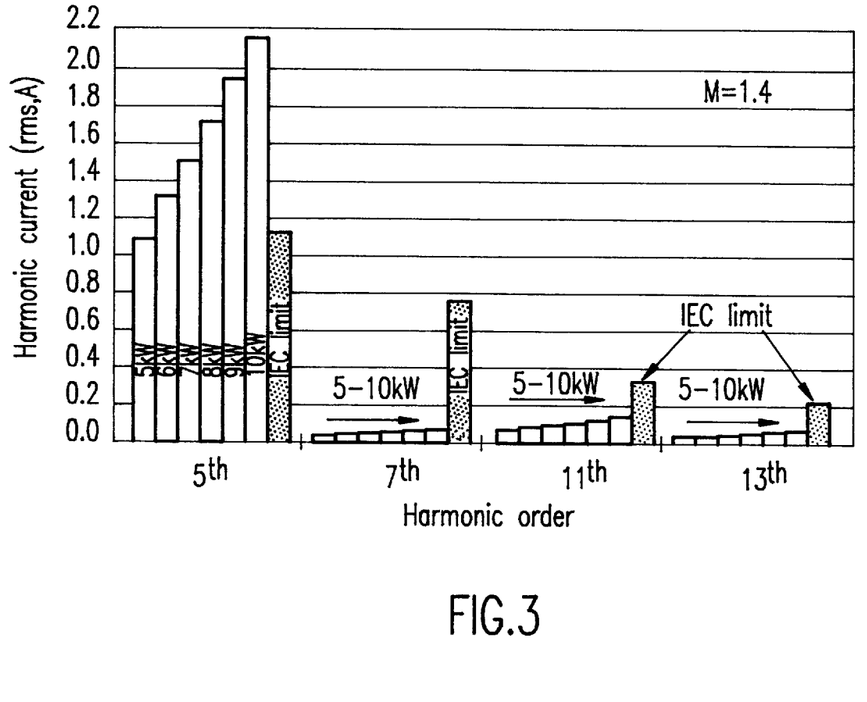
FIG. 3 is a comparison between input-current harmonic content of the DCM boost rectifier of FIG. 1 and harmonic-current limits of the IEC555-2 for M=1.4, $V_{out}$=750 V, $V_{in(L-L)}$=380 $V_{rms}$, and input-power range $P_{in}$=5 kW–10 kW.

Generally, the maximum input power at which the three-phase, constant-frequency, DCM boost rectifier can meet the IEC555-2 specifications is limited by the $5^{th}$-order harmonic of the input current. As an illustration, FIG. 3 shows the $5^{th}$, $7^{th}$, $11^{th}$, and $13^{th}$ harmonics of the DCM boost rectifier with M=1.4 and input power levels from 5 kW to 10 kW, along with the corresponding IEC555-2 limits. As can be seen from FIG. 3, for M=1.4 the rectifier can meet the IEC555-2 requirements only for power levels not exceeding 5 kW because of the $5^{th}$-harmonic limitation. The higher-order harmonics, i.e., $7^{th}$, $11^{th}$, $13^{th}$, etc., are well below the IEC555-2 limits, even for power levels over 10 kW.

To meet the IEC555-2 specifications at input-power levels above 5 kW, the DCM boost rectifier must be designed with a higher conversion ratio M, i.e., with the output voltage much higher than the peak of the input voltage. Inevitably, such designs require higher voltage-rated switches, which are more expensive and usually have more losses than their lower-voltage-rated counterparts. Generally, to reduce the $5^{th}$-order harmonic and to improve the total harmonic distortion (THD) of the input currents, the duty cycle of the rectifier switch needs to be properly modulated during a rectified line period instead of being kept constant.

Recently, a number of duty-cycle modulation techniques for the DCM boost rectifier have been introduced to reduce the $5^{th}$-order harmonic of the input current and to improve the THD so that the power level at which the input-current-harmonic content still meets the IEC555-2 standard is extended. Specifically, the approach based on the variable-switching-frequency control was presented and analyzed in "Single-Switch Three-Phase Power Factor Under Variable Switching Frequency and Discontinuous Input Current," by L. Simonetti et al., *IEEE Power Electronics Specialists Conf. (PESC) Record*, pp 657–662, 1993 and "Space Vector-Based Analytical Analysis of the Input Current Distortion of a Three-Phase Discontinuous-Mode Boost Rectifier System," by J. W. Kolar et al., *IEEE Power Electronics Specialists Conf. (PESC) Record*, pp. 696–703, 1993. However, since the switching frequency of these rectifiers directly depends on the input voltage and output power variations, this technique suffers from a very wide switching-frequency range which decreases the efficiency and makes the rectifier design, device selection, and control circuit more complex.

To improve the performance of the DCM boost rectifier at a constant switching frequency, $6^{th}$-harmonic injection methods have been proposed in an article entitled "Harmonic Reduction in a Single-Switch, Three-Phase Boost Rectifier with High Order Harmonic Injected PWM," by Q. Huang et al., *IEEE Power Electronics Specialists Conf. (PESC) Record,* pp. 1266–1271, 1996, and "Harmonic Reduction Techniques for Single-Switch Three-Phase Boost Rectifiers," by J. Sun et al., *Conference Record of the 1996 IEEE Industry Applications Society Annual Meeting,* pp. 1225–1232, 1996, both of which are incorporated herein by reference. The injected $6^{th}$-harmonic signal modifies the duty cycle of the rectifier switch so that the $5^{th}$-order harmonic of the input current and the overall THD are reduced to meet the IEC555-2 requirements. However, in this technique, if the phase of the injected $6^{th}$-harmonic signal is not well synchronized with the $5^{th}$-order harmonic of the input current, the expected reduction of the $5^{th}$-order harmonic and the improvement of the THD cannot be achieved. For example, the proposed $6^{th}$-harmonic injection circuit in the Huang et al. article, which employs a bandpass filter, has a severe phase shift problem which requires expensive phase-detecting and phase-locking circuits for reliable operation. The harmonic-injection technique which utilizes the voltage ripple of the rectifier output voltage and employs phase-detecting and phase-locking circuits to properly synchronize the injected signal with the rectifier input currents is proposed in the Sun et al publication.

SUMMARY OF THE INVENTION

An object of this invention is the provision of robust, low-cost, harmonic-injection method for the single-switch, three-phase, DCM boost rectifier in order to reduce the 5-th order harmonic and improve the THD of the rectifier input currents.

Briefly, this invention contemplates the provision of a single-switch, three-phase, DCM boost rectifier in which a voltage signal proportional to the inverted ac component of the rectified, three-phase, line-to-line input voltages is injected as a modulating signal into the control circuit to vary the duty cycle of the rectifier within one line cycle. As a result of its generation method, the injected signal is naturally synchronized with the three-phase, line-to-neutral input voltage. In addition, the injection method of this invention does not affect the closed-loop feedback control of the DCM boost rectifier since the injected signal is generated in an open-loop fashion. Three alternative methods to generate the injection signal are described. One method uses three low-frequency, step down transformers in generating the injection signal. The other two methods use operational amplifiers instead of the transformers.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 4A:
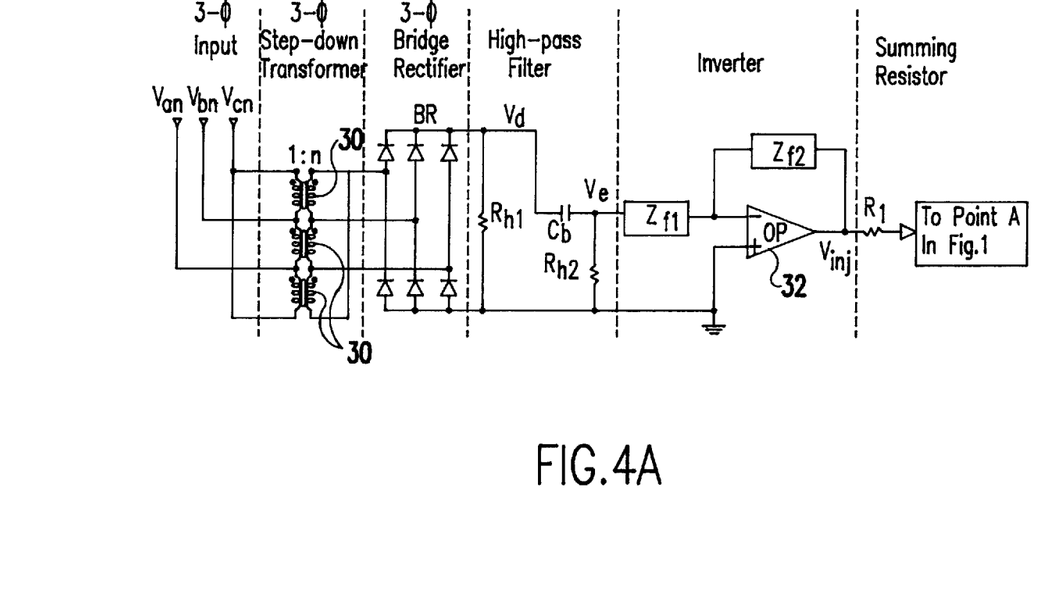
FIG. 4(a) is a schematic diagram of one embodiment of a harmonic injection circuit in accordance with this invention using isolation transformers.
Figure 4B:
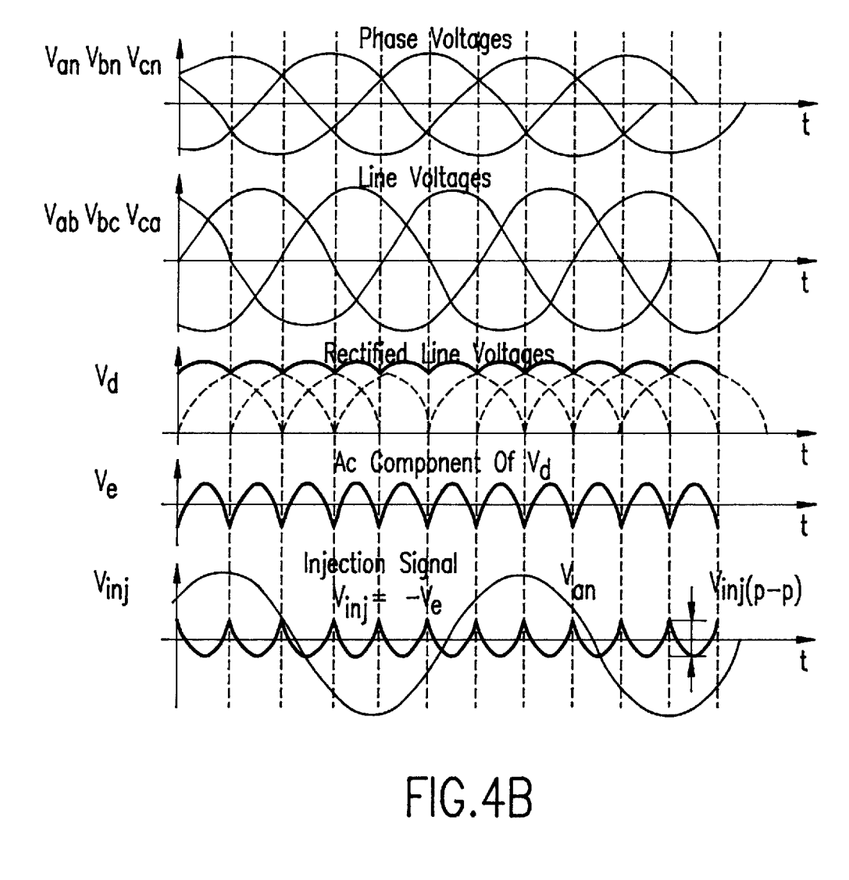
FIG. 4(b) shows key voltage waveforms of the circuit in FIG. 4(a). The waveforms shown in FIG. 4(b), from top to bottom, are: phase voltages ($V_{an}$, $V_{bn}$, $V_{cn}$); line voltages ($V_{ab}$, $V_{bc}$, $V_{ca}$); rectified line voltage ($V_d$); ac-component of rectified line voltage ($V_e$); and injection signal ($V_{inj}$).

In this invention, a signal proportional to the inverted ac component of the three-phase, line-to-line, input voltages is injected into the control circuit in FIG. 1 to modulate the duty cycle of the boost rectifier switch and to reduce the $5^{th}$-order harmonic of the line currents. The circuit diagram of the injection-signal generator of this invention implemented with three low-frequency, step-down sensing transformers 30 is shown in FIG. 4(a), whereas its key waveforms are shown in FIG. 4(b). Besides the 3-phase sensing transformer, the circuit in FIG. 4(a) also incorporates three-phase bridge rectifier BR, high-pass filter $R_{h1}$-$C_b$-$R_{h2}$ and an op-amp 32 with a feedback network ($Z_{f1}$ and $Z_{f2}$). The three low-frequency transformers 30 are utilized for the voltage step-down and isolation between the injection circuit and the power stage. The primary terminals of the step-down transformers are connected between the line-to-line input voltages $V_{ab}$, $V_{bc}$, and $V_{ca}$. The secondary-side voltages of the transformers are rectified by three-phase diode bridge BR. The dc component of rectified voltage $V_d$ across resistor $R_{h1}$ is eliminated by blocking capacitor $C_b$ of the high-pass filter. Since the impedance of $C_b$ at the line frequency is much smaller than $R_{h2}$, the voltage across $R_{h2}$ is nearly identical to the ac component of $V_d$. To obtain the desired polarity of injection signal $V_{inj}$, shown in FIG. 4(b), the polarity of signal $V_e$ is inverted by the op-amp 32. Finally, $V_{inj}$ is injected in the circuit in FIG. 1 at point A through summing resistor $R_1$.

Since the injection-signal generator does not contain a bandpass filter but only a first-order high-pass filter $C_b$-$R_{h2}$ with its corner frequency well below the frequency of the $6^{th}$-order harmonic, the injection-signal, which contains the $6^{th}$ and higher-order harmonics, does not suffer any significant delay. As a result, the injection signal $V_{inj}$ phase is automatically well synchronized with all the input currents and line-to-neutral voltages. Moreover, this phase synchronization does not drift with time and it is not sensitive to component tolerances.

Figure 5:
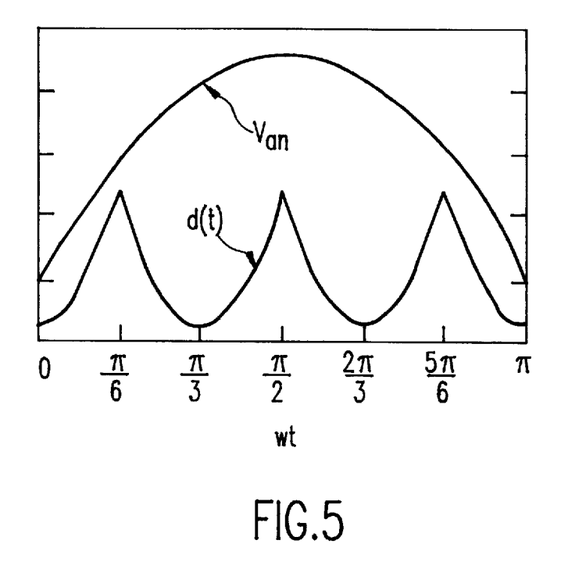
FIG. 5 shows duty-cycle variations during a half of the fundamental line period using the harmonic injection method of this invention.

When signal $V_{inj}$, shown in FIG. 4 (b), is injected at the input of the PWM modulator (node A in FIG. 1), it modifies the duty cycle so that the $5^{th}$-order harmonic of the input current is reduced and the THD are improved. In fact, since the variation of duty cycle d(t) is directly proportional to the injected signal $V_{inj}$, which is proportional to the inverted ac component of the rectified three-phase line-to-line input voltages, the variation of duty cycle d(t) during a half of the fundamental line period can be plotted along with the line-to-neutral input voltage, as shown in FIG. 5. From the figure, it can be seen that the generated injection signal contains not only the $6^{th}$-order harmonic but also higher-order harmonics such as $12^{th}$, $18^{th}$, etc. It was found that these higher-order harmonics help improve the THD more than if only the $6^{th}$-order harmonic is injected.

Figure 6:
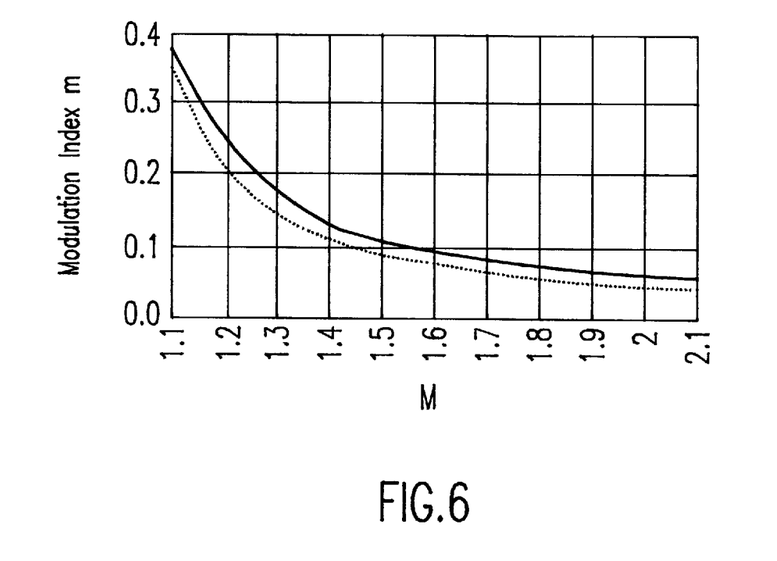
FIG. 6 shows optimal modulation index m versus voltage conversion ratio M for the minimum THD (solid line) and for the maximum output power (dashed line) using an injection method of this invention.
Figure 7:
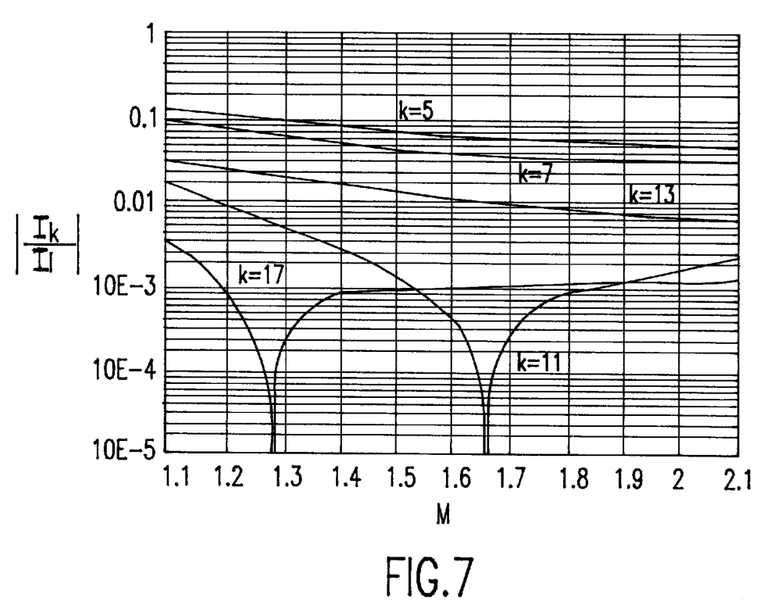
FIG. 7 shows normalized input-current harmonics of the single-switch, three-phase, DCM boost rectifier with the harmonic-injection control of the invention. Harmonics $I_k$ are normalized with respect to the fundamental component $I_l$.

The magnitude ratio between the peak-to-peak value of injected signal $V_{inj(p-p)}$ shown in FIG. 4(b) and feedback control signal $V_{cont}$ (error-amplifier output voltage) shown in FIG. 1 is represented by modulation index $m=V_{inj(p-p)}/V_{cont}$. At any given voltage-conversion ratio M, optimal modulation index m which produces the minimum THD can be determined. FIG. 6 shows the values of optimal modulation index m for the minimum THDs (solid line) as a function of M. To maximize the input power of the rectifier at which the IEC555-2 specifications are met, modulation index m should be determined so that the ratio of the $7^{th}$-order harmonic and the $5^{th}$-order harmonic is equal to corresponding IEC555-2 limits, i.e., $$\frac{7^{th}\text{-order harmonic }(I_{7,rms})}{5^{th}\text{-order harmonic }(I_{5,rms})} = \frac{0.77A}{1/14A} = 0.675$$

where 1.14 A and 0.77 A are IEC555-2 limits for the $5^{th}$-order harmonic and the $7^{th}$-order harmonic, respectively. It should be noted that the effects of the higher-order harmonics are not significant in comparison with the $5^{th}$ and $7^{th}$-order harmonics. Moreover, the higher frequency harmonics can be easily eliminated by an EMI input filter. FIG. 6 shows the optimal modulation index m for the maximum input power (dashed line) as a function of M. Using the optimal modulation index m for the maximum input power, a normalized harmonic content of the rectifier input current can be calculated as shown in FIG. 7. It can be seen that the magnitudes of the $5^{th}$, $7^{th}$, and $13^{th}$ harmonics are linearly proportional to one another.

Figure 8:
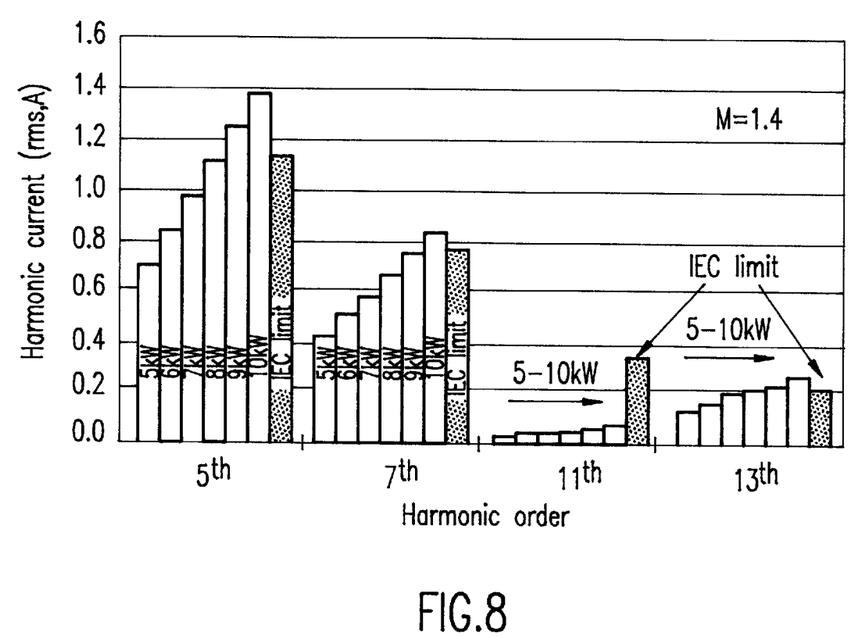
FIG. 8 is a comparison between input-current harmonic content of the DCM boost rectifier with the harmonic injection of the invention and harmonic-current limits of the IEC555-2 for M=1.4, $V_{out}$=750 V, $V_{in(L-L)}$=380 $V_{rms}$, and input-power range $P_{in}$=5 kW–10 kW, i.e., the same parameters as in FIG. 3.

FIG. 8 shows the estimated $5^{th}$, $7^{th}$, $11^{th}$, and $13^{th}$ harmonics of the input current of the DCM boost rectifier with harmonic-injection control for input power levels from 5 kW to 10 kW. The harmonics are obtained by assuming that line-to-line input voltage $V_{in(LL)}=380$ $V_{rms}$ and output voltage $V_o=750$ $V_{dc}$, i.e., assuming $M=V_o/V_m=1.4$. The IEC555-2 limits for each of the harmonics are also shown in FIG. 8. As can be seen from FIG. 8, employing the proposed injection method, the maximum power of the rectifier at which the IEC555-2 requirements are met is extended to 8 kW. As shown in FIG. 3, the corresponding maximum power for the rectifier without harmonic injection at M=1.4 is only about 5 kW.

Figure 9:
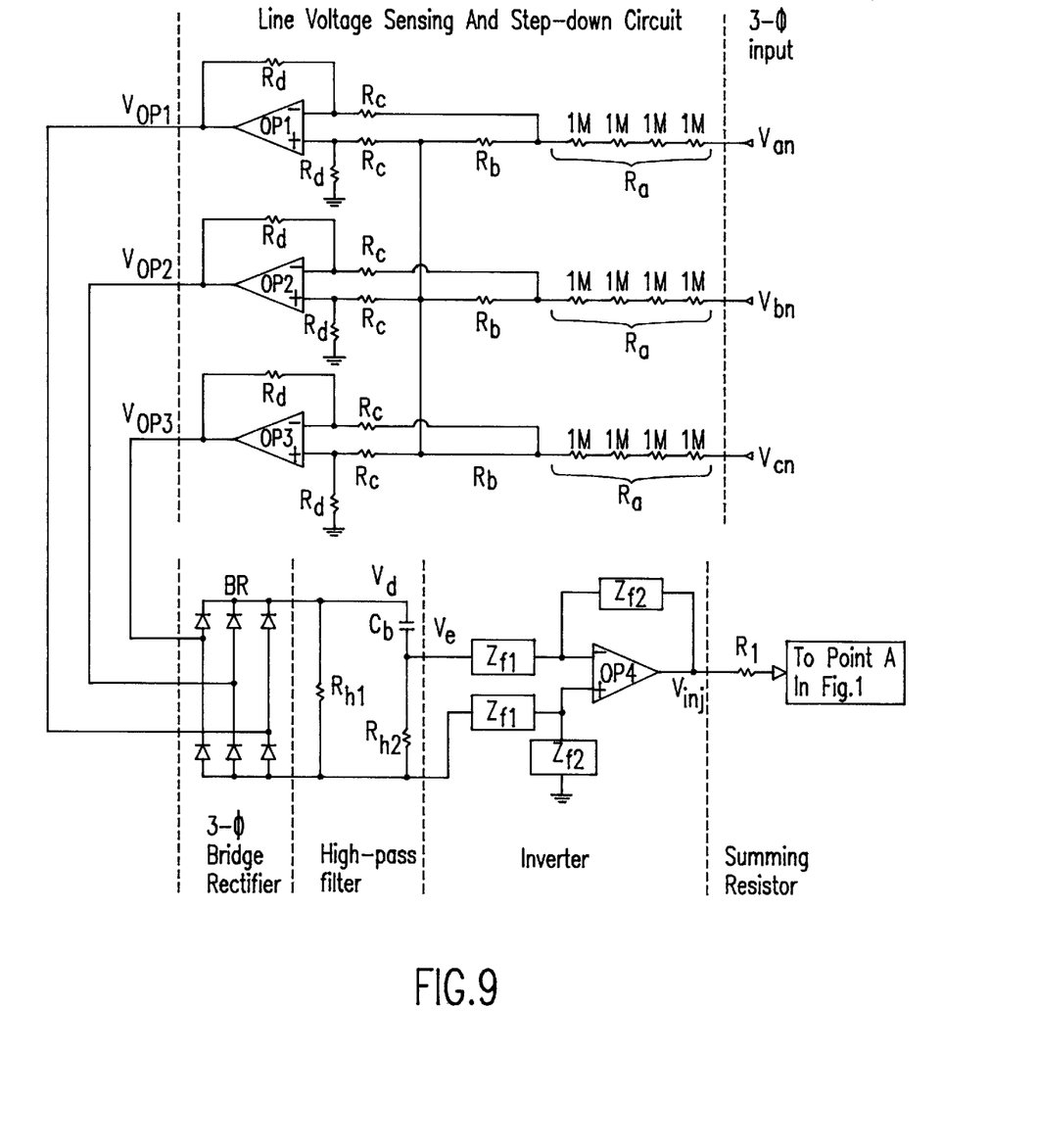
FIG. 9 is a schematic diagram of another embodiment of the harmonic-injection circuit of the invention with difference op-amps. The key circuit waveforms are the same as in FIG. 4(b).
Figure 10:
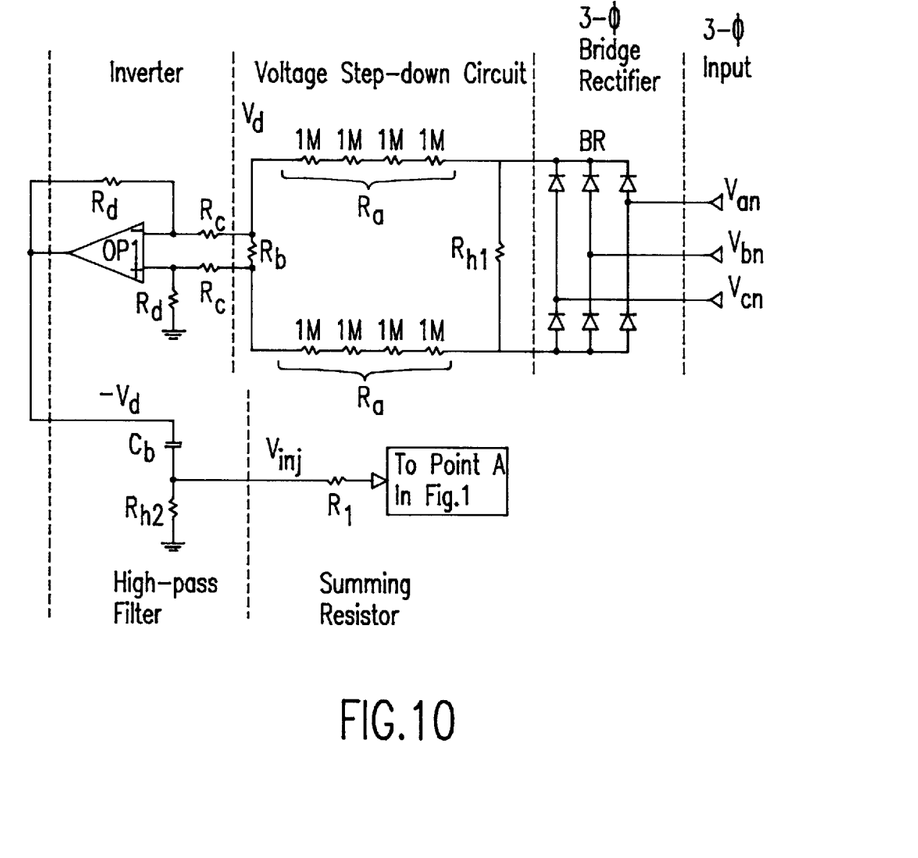
FIG. 10 is a schematic diagram of yet another embodiment of the harmonic-injection circuit of the invention. The key circuit and waveforms are the same as in FIG. 4(b).

The injection signal generator can also be implemented without the bulky, 3-phase, low-frequency, step-down transformers, as shown in FIGS. 9 and 10. The performance of the circuits in FIGS. 9 and 10 are identical to that of the circuit in FIG. 4. However, the injection circuits shown in FIGS. 9 and 10 are less expensive than the circuit shown in FIG. 4.

The circuit in FIG. 9 employs resistive voltage dividers $R_a$-$R_b$, and op-amps OP1-OP3 configured as difference amplifiers to sense and step-down the three-phase input voltages to the desired level. Namely, the Y-connected resistive voltage dividers $R_a$-$R_b$ are connected to the line-to-line input voltages $V_{ab}$, $V_{bc}$, and $V_{ca}$. The step-down line-to-neutral voltages across resistor $R_b$ are then processed by op-amps OP1-OP3 which are referenced to the control ground. It should be noted that the control ground is isolated from the ground of the three-phase input voltages by the series connection of resistors $R_a$, whose total resistance is in the megaohm range. The output voltages of the difference amplifiers are further rectified by three-phase bridge rectifier BR. The dc component of rectified voltage $V_d$ is then eliminated by the blocking capacitor $C_b$ of the high-pass filter. Since the impedance of the blocking capacitor $C_b$ at the line frequency is much smaller than $R_{h2}$, the voltage across $R_{h2}$ is nearly identical to the ac component of $V_d$. To obtain the desired polarity of injection signal $V_{inj}$, shown in FIG. 4(b), the polarity of signal $V_e$ is inverted by difference amplifier OP4. Finally, $V_{inj}$ is injected in the circuit in FIG. 1 at point A through summing resistor $R_1$. As in the case of the implementation with the transformers, voltage signal $V_{inj}$ is naturally in phase with all input currents and line-to-neutral voltages. In the implementation in FIG. 10, the line voltage is first rectified by three-phase bridge rectifier BR, and then attenuated by resistive voltage divider $R_a$-$R_b$. The scaled-down line voltage developed across $R_b$, $V_d$, is then inverted by difference amplifier OP1 before it is processed through the high-pass filter $C_b$-$R_{h2}$ to remove the dc component of $V_d$ and generate injection signal $V_{inj}$. Finally, $V_{inj}$ is injected in the circuit in FIG. 1 at point A through summing resistor $R_1$. Because in this implementation the three-phase line voltages are directly rectified, the circuit can be implemented with the minimum number of components, i.e., it requires only one op-amp. However, due to a direct rectification, the implementation in FIG. 10 requires a high-voltage-rated bridge rectifier BR which can sustain the blocking voltages equal to the line-to-line peak voltages. In the implementation in FIG. 9, low-voltage-rated bridge rectifier BR can be used since the line voltages are attenuated before the rectification.

We claim:

1. A single-switch, three-phase, discontinuous conduction mode, boost rectifier, comprising in combination:

a three-phase, ac source comprised of phase a, phase b, and phase c, generating three-phase, line-to-line ac voltages $V_{ab}$, $V_{bc}$, and $V_{ca}$, and line-to-neutral voltages $V_{an}$, $V_{bn}$, and $V_{cn}$;

boost inductor means coupled to said line-to neutral voltages $V_{an}$, $V_{bn}$, and $V_{cn}$;

a three-phase rectifier having an ac input connected to said boost inductor means and a dc output;

a switch connected across said dc output;

a load and a filter capacitor connected across said dc output and a rectifier connected in series between said switch and said load;

a pulse-width-modulating controller having a control input connected to a modulating signal and an output connected to said switch to control an open-close duty cycle of said switch in accordance with said modulating signal;

means for generating a signal proportional to an inverted, rectified, ac component of said three-phase, line-to-line voltages $V_{ab}$, $V_{bc}$, and $V_{ca}$; and means to couple said signal proportional to the inverted, rectified, ac component of the three-phase, line-to-line voltages $V_{ab}$, $V_{bc}$, and $V_{ca}$ to said control input to further modulate the open-close duty cycle of said switch.

2. A single-switch, three-phase, discontinuous conduction mode, boost rectifier as in claim 1 wherein said means for generating a signal proportional to the inverted, rectified, ac component of said three-phase, line-to-line voltages $V_{ab}$, $V_{bc}$, and $V_{ca}$ includes line-to-line step-down transformers.

3. A single-switch, three-phase, discontinuous conduction mode, boost rectifier as in claim 1 wherein said means for generating a signal proportional to an inverted, rectified, ac component of said three-phase, line-to-line voltages $V_{ab}$, $V_{bc}$, and $V_{ca}$ includes a plurality of operational amplifiers to step down the ac voltage.

4. A single-switch, three-phase, discontinuous conduction mode, boost rectifier as in claim 1 wherein said means for generating a signal proportional to an inverted, rectified, ac component of said three-phase, line-to-line voltages $V_{ab}$, $V_{bc}$, and $V_{ca}$ includes three sensing, step-down transformers with primary inputs connected respectively to said three-phase line-to-line voltages $V_{ab}$, $V_{bc}$, and $V_{ca}$, and secondary outputs coupled to a three-phase bridge rectifier; an output of said three-phase bridge rectifier coupled to an input of a high pass filter, an output of said high pass filter coupled to the input of an inverter, and an output of said inverter coupled to a summing resistor.

5. A single-switch, three-phase, discontinuous conduction mode, boost rectifier as in claim 1 wherein said means for generating a signal proportional to an inverted, rectified, ac component of said three-phase, line-to-line voltages $V_{ab}$, $V_{bc}$, and $V_{ca}$ includes three operational amplifiers with their inputs connected respectively to the three-phase line-to-neutral voltages $V_{an}$, $V_{bn}$, and $V_{cn}$ and the outputs of said operational amplifiers coupled to a three-phase bridge rectifier; an output of said three-phase bridge rectifier coupled to an input of a high pass filter, and an output of said high pass filter coupled to the input of an inverter.

6. A single-switch, three-phase, discontinuous conduction mode, boost rectifier as in claim 1 wherein said means for generating a signal proportional to an inverted, rectified, ac component of said three-phase, line-to-line voltages $V_{ab}$, $V_{bc}$, and $V_{ca}$ includes a voltage divider to step down the ac voltage.

7. A single-switch, three-phase, discontinuous conduction mode, boost rectifier as in claim 1 wherein said means for generating a signal proportional to an inverted, rectified, ac component of said three-phase, line-to-line voltages $V_{ab}$, $V_{bc}$, and $V_{ca}$ includes a three-phase bridge rectifier with its input connected to the line-to-neutral three-phase voltages $V_{an}$, $V_{bn}$, and $V_{cn}$, a resistive voltage divider to step down the ac voltage, an operational amplifier to invert the stepped down ac voltage, and a high pass filter.

* * * * *